United States Patent [19]

Kiger et al.

[11] Patent Number: 4,832,540
[45] Date of Patent: May 23, 1989

[54] RECONDITIONED MILLING TOOL AND METHOD OF MAKING SAME

[75] Inventors: William E. Kiger, Germantown; Jimmy A. Cox, Clemmons, both of N.C.

[73] Assignee: Westinghouse Electric Corp., Pittsburgh, Pa.

[21] Appl. No.: 186,871

[22] Filed: Apr. 27, 1988

[51] Int. Cl.⁴ .......................... B23C 5/22; B23C 5/10; B23C 5/26; B23C 5/06

[52] U.S. Cl. ........................................ 407/34; 407/35; 407/46; 407/50; 407/110; 403/290; 403/317; 403/381; 409/234

[58] Field of Search ........................ 82/36 R, 36 B, 37; 403/289, 290, 315, 316, 317, 344, 373, 381; 407/30, 33, 34, 35, 40, 41, 46, 49, 50, 109, 110; 409/234

[56] References Cited

U.S. PATENT DOCUMENTS

| | | | |
|---|---|---|---|
| 453,720 | 6/1891 | Neilson | 403/290 |
| 866,361 | 9/1907 | Hitchcock | 403/381 |
| 902,169 | 10/1908 | Richards | 82/36 R |
| 929,234 | 7/1909 | Mather | 403/381 |
| 2,289,583 | 7/1942 | Malone | 403/317 |
| 2,986,056 | 5/1961 | Irwin et al. | 82/36 R |
| 3,433,104 | 3/1969 | Milewski et al. | 82/36 R |

Primary Examiner—Frederick R. Schmidt
Assistant Examiner—William E. Terrell

[57] ABSTRACT

A reconditioned tool comprises a cylindrical insert cut from a damaged tool, such as a hog mill, with a milling face formed on one end and a transverse dovetail tenon cut in the other end. The dovetail tenon engages a transverse dovetail mortise in the end face of a cylindrical holder. A transverse slot in the holder splits the end of the holder into two axially extending end sections each of which includes one-half of the dovetail mortise. A clamping device, such as a bolt, draws the two end sections of the holder together to pull the insert firmly against the end faceof the holder through wedging action of the two halves of the dovetail mortise against the dovetail tenon. A locking pin inserted through aligned transverse grooves in the holder and insert prevents a lateral displacement of the insert relative to the holder.

8 Claims, 3 Drawing Sheets

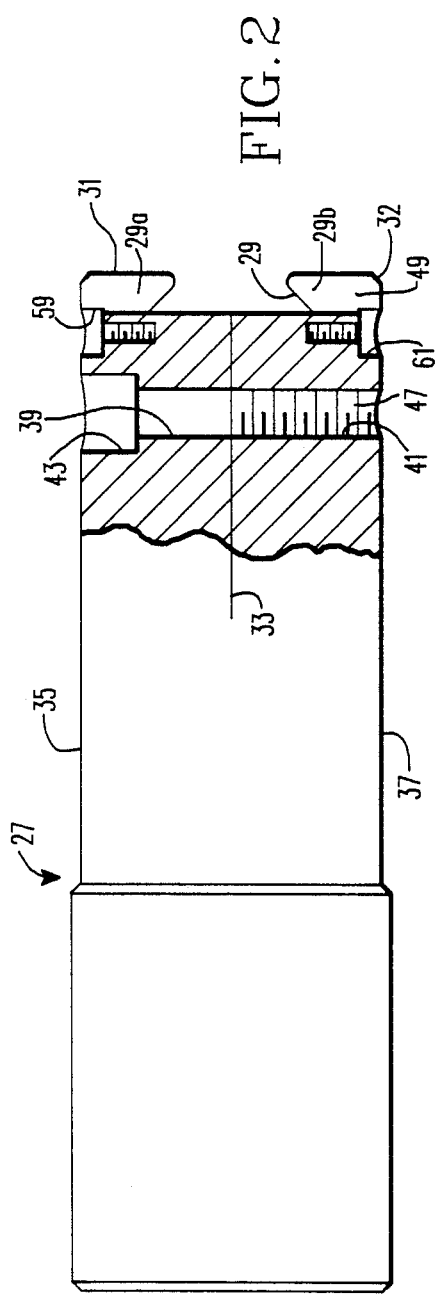
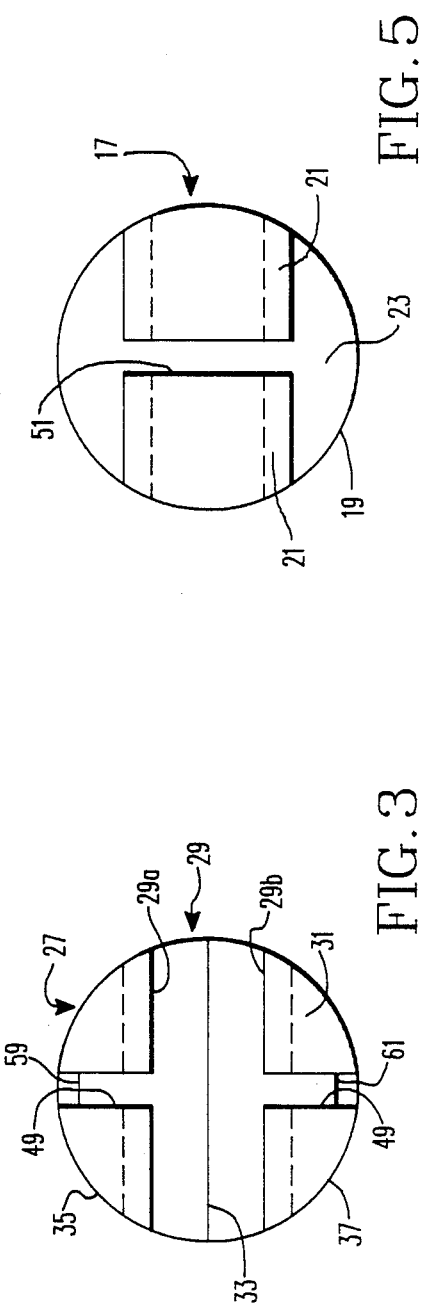

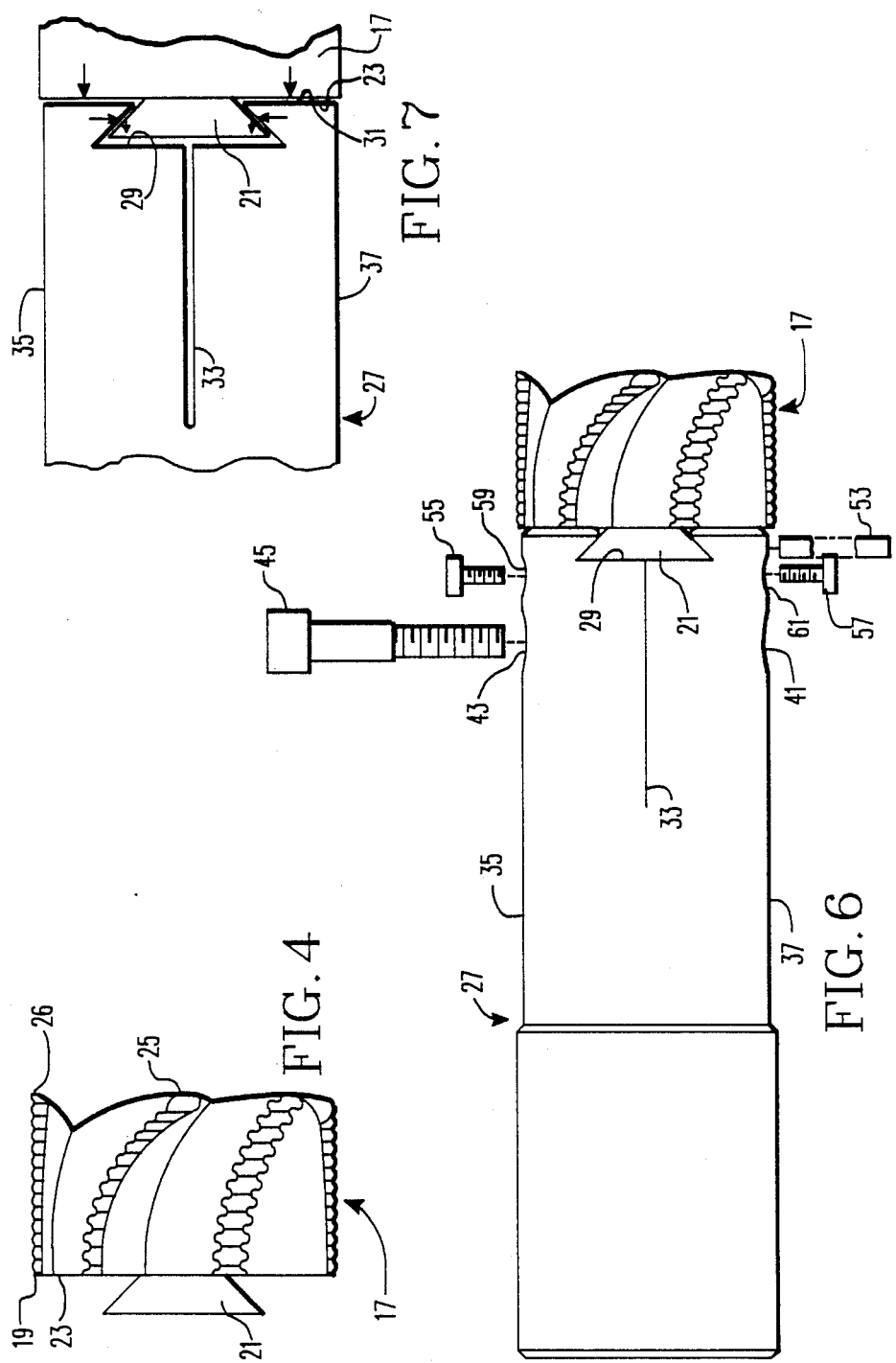

4,832,540

1

RECONDITIONED MILLING TOOL AND METHOD OF MAKING SAME

BACKGROUND OF THE INVENTION

1. Field of the Invention

This invention relates to milling tools and a method of making them, and more specifically to hog mills made from a holder and an insert formed from a damaged hog mill.

2. Background Information

Hog mills are cylindrical tools with cutting edges on the end face and serrated teeth on the cylindrical surface. Such tools are used in rough machining of various metal parts, such as, for instance, turbine blades.

While hog mills are typically made of hardened steel, it is not uncommon for the tool to become cracked, chipped or otherwise damaged. In many metal working operations, only the end of the hog mill is used, but extended tool gage length are required for fixture and part clearances. Damage to the working end of a tool with this extra length turns the entire tool into scrap even though 75% of the cutting surface remains. Thus, damage to only the end of the hog mill results in costly replacement of the entire tool.

There is a need therefore in reducing the cost of replacing damaged hog mills.

SUMMARY OF THE INVENTION

These and other needs are satisfied by the present invention in which multiple cutting inserts are fabricated from a damaged tool and secured in a reusable holder. In view of the very large pulsating forces acting upon such a milling tool, it is imperative that a firm connection be made between the insert and the holder.

To this end, the cylindrical holder is provided with a transverse dovetail mortise extending across an end face. A transverse slot extending axially through the dovetail mortise splits the end of the holder into two axially extending end sections each of which includes one-half of the dovetail mortise.

Cylindrical cutting inserts are cut from the used tool from which the damaged portion has been removed. The inserts are formed with a dovetail tenon extending transversely across one end face.

The dovetail tenon on the insert engages the dovetail mortise on the holder to axially align the insert with the holder. A clamping device draws the two end sections of the holder together to pull the end face of the insert firmly against the end face of the holder through the wedging action of the two halves of the dovetail mortise acting on the dovetail tenon. Preferably, the clamping device comprises a bolt seated in a counterbored hole drilled through one section of the holder which threads into a tapped bore in the other section.

Preferably, the width of the transverse slot splitting the holder into two sections has a width selected such that the two end sections of the holder abut one another as the end face of the insert seats firmly against the end face of the holder to preclude over stressing of the dovetail tenon and mortise.

As another feature of the invention, the dovetail tenon on the insert is locked from sliding within the dovetail mortise by a locking pin which is inserted into transverse passages through the holder which align with a transverse passage through the dovetail tenon on the insert. Preferably, these transverse passages are grooves cut into the end face of the holder and through

2 the dovetail tenon on the insert. Retaining members in the form of cap head socket screws, retain the locking pin in the grooves.

BRIEF DESCRIPTION OF THE DRAWINGS

A full understanding of the invention can be gained from the following description of the preferred embodiment when read in conjunction with the accompanying drawings in which:

FIG. 2 is a side view of a holder in accordance with the invention with part in section.

FIG. 3 is an end view of the holder of FIG. 2.

FIG. 4 is a side view of a completed cutter insert in accordance with the invention.

FIG. 5 is an end view of the insert of FIG. 4.

FIG. 6 is a partially exploded view of a reconditioning hog mill in accordance with the invention.

FIG. 7 is an enlarged section of FIG. 6 illustrating the wedging action in accordance with the invention which pulls the cutter insert firmly into contact with the holder.

DESCRIPTION OF THE PREFERRED EMBODIMENTS

Figure 1:
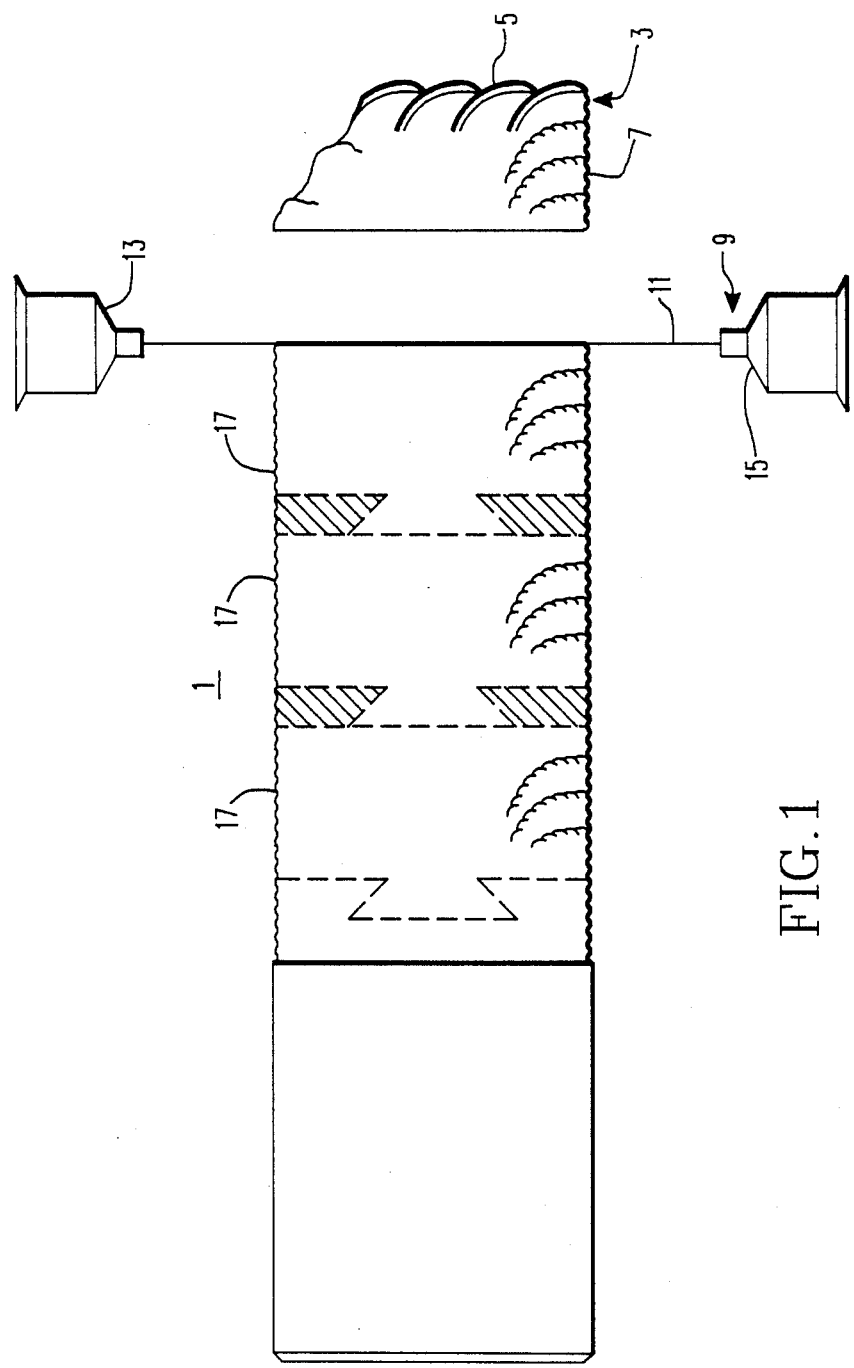
FIG. 1 is a side view of a damaged hog mill indicating the manner in which cutter inserts are cut therefrom in accordance with the invention.

FIG. 1 illustrates a hog mill tool 1 from which a damaged end piece 3 having milling cutters 5 on the end and serrated teeth 7 on the cylindrical side has been removed.

Such hog mill tools 1 are made from high speed steel which is hardened by heat treatment. In order to cut such hard material a wire electric discharge machine (wire-EDM) 9 can be used. This machine cuts through the hog mill 1 using a fine electrically charged wire 11 guided by upper and lower wire guides 13 and 15 respectively. Wire-EDM machining is capable of producing close tolerances and narrow widths of cut ranging from 0.0035 inches (0.0897 mm) to 0.013 inches (0.333 mm) wide, with no restrictions on hardness of the material.

With the end piece 3 removed, cylindrical cutting inserts 17 are cut from the remainder of the damaged tool. One end 19 of each insert is cut with the wire electric discharge machine to form a transverse dovetail tenon 21 which projects from a flat end face 23. As indicated in FIG. 4, milling cutters 25 are machined into the other end of the inserts 17. As illustrated by FIG. 1, several inserts 17 can be salvaged from a single damaged tool 1.

The insert 17 is attached to a cylindrical holder 27 having a transverse dovetail mortise 29 cut in a circular face 31 at one end 32 of the holder. As shown in FIGS. 2 and 3, a transverse slot 33 extending axially through the dovetail mortise 29 splits the end 32 of the holder into two end sections 35 and 37 of essentially semi-circular cross section, each of which includes a half 29a and 29b respectively, of the dovetail mortise 29. The dovetail mortise 29 and the slot 33 can both be cut by the wire electric discharge machine. The slot 33 forms a gap between the two holder end sections 35 and 37 which is important to the operation of the invention as explained below.

Aligned bores 39 and 41 are drilled transversely through the holder end sections 35 and 37 respectively normal to the plane of the slot 33. The bore 39 is counterbored at 43 to form a seat for the head of a socket bolt 45 (see FIG. 6) which engages the threads 47 of tapped bore 41.

A passage in the form of a transverse groove 49 is cut in the end face 31 of the ends 35 and 37 of the holder 27 normal to the dovetail mortise 29. A corresponding transverse passage in the form of the groove 51 is cut through the dovetail tenon 21 on the insert. (See FIG. 5.)

To assemble the tool, the dovetail tenon 21 on the insert is inserted into the dovetail mortise 29 on the holder to axially align the two parts as shown in FIG. 6. This brings the groove 51 in the tenon 21 into alignment with the grooves 49 in the ends 35 and 37 of the holder 27. A locking pin 53 is inserted into these grooves to fix the lateral alignment of the insert 17 within the holder 27. Button head cap screws 55 and 57 are threaded into tapped and counterbored bores 59 and 61 in ends 35 and 37 respectively of the holder 27 to retain the locking pin 53.

With the insert 17 properly aligned with the holder by the locking pin 53, the bolt 45 is inserted into bore 39 and threaded into the tapped bore 41 to draw the two end sections 35 and 37 of the holder 27 toward each other to pull the end face 23 of the insert firmly against the end face 31 of the holder. This results from the wedging action of the undercut surfaces of the two halves 29a and 29b of the dovetail mortise 29 acting against the undercut surfaces of the dovetail tenon 21 which generates an axial component from the clamping force generated by tightening the bolt as illustrated in FIG. 7.

In order to prevent overstressing of the dovetail mortise 29 and tenon 21, the width of the slot 33 (which is shown exaggerated in FIG. 7) is selected such that the two end sections 35 and 37 of the holder 27 abut one another as the face 23 of the insert seats firmly against the end face of the holder. In an exemplary tool, in which the side faces of the dovetail tenon 21 and mortise 29 are angled at 45 degrees, the width of the slot 33 is 0.013 inches (0.33 mm). This slot was cut with a 0.012 inch (0.308 mm) wire in the wire electric discharge machine. A clearance of 0.005 inches (0.128 mm) was provided in the depth of the dovetail mortise 29 to assure that the face 23 of the insert 17 seated against the face 31 of the holder 27 rather than the tenon 21 seating against the bottom of the mortise 29. Preferably, the width of the slot 33 does not exceed about 0.016 inches (0.410 mm) to avoid over stressing the dovetail mortise 29 and tenon 27.

Tools made in accordance with the invention realize a substantial tooling cost improvement.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A tool comprising:
    a cylindrical holder having at one end an end face defining therein a transverse dovetail mortise and a transverse slot extending axially from said end face through said dovetail mortise splitting said one end of the cylindrical holder into two axially extending end sections each of which includes in the end thereof half of the dovetail mortise;
    an insert comprising a cylindrical section having first and second ends, the first end defining cutting teeth, and the second end defining an end face with a transverse dovetail tenon extending therefrom, said transverse dovetail tenon engaging the transverse dovetail mortise in the holder; and
    clamping means drawing the two end sections of the holder together to pull the end face of the insert down firmly against the end face of the holder through wedging action of the two halves of the dovetail mortise against the dovetail tenon;
    said transverse slot splitting the holder into two axially extending end sections having a width in relation to the dimensions of the tenon and mortise selected such that the two end sections of the holder abut one another as the end face of the insert seats firmly against the end face of the holder, and the dovetail mortise having a bottom and a depth to the bottom such that with said end face of the insert sealed against the end face of the holder there is clearance between the tenon and said bottom of the dovetail mortise, thereby precluding overstressing of the dovetail tenon and mortise.

2. The tool of claim 1 wherein said clamping means comprises aligned bores in said holder end sections transverse to said slot, and a fastener extending through said bores and engaging said end sections.

3. The tool of claim 2 wherein the bore in one of said holder end sections is tapped and the fastener is a bolt which seats against the other holder end section and threads into the tapped bore.

4. The tool of claim 1 including locking means independent of said clamping means for locking the dovetail tenon of the insert in the dovetail mortise of the holder.

5. The tool of claim 4 wherein said locking means includes transverse passages through said holder end sections which align with a transverse passage through the dovetail tenon on said insert, and a locking pin extending through said passages.

6. The tool of claim 5 including retaining means to retain the locking pin in said passages.

7. The tool of claim 5 wherein said dovetail tenon has an end face and said transverse passages through the holder end sections comprise grooves in the end face of the holder transverse to the dovetail mortise and wherein the transverse passage in the dovetail tenon comprises a groove extending transversely across the end face of the dovetail tenon.

8. A tool comprising:
    a cylindrical holder having at one end an end face defining therein a transverse dovetail mortise and a transverse slot extending axially from said end face through said dovetail mortise splitting said one end of the cylindrical holder into two axially extending end sections each of which includes in the end thereof half of the dovetail mortise;
    an insert comprising a cylindrical section having first and second ends, the first end defining cutting teeth, and the second end defining an end face with a transverse dovetail tenon extending therefrom, said transverse dovetail tenon engaging the transverse dovetail mortise in the holder;
    clampig means drawing the two end sections of the holder together to pull the end face of the insert down firmly against the end face of the holder through wedging action of the two halves of the dovetail mortise against the dovetail tenon; and locking means, independent of the clamping means locking the dovetail tenon of the insert in the dovetail mortise of the holder, said locking means comprising a groove in the end face of the holder transverse to the dovetail mortise, a groove extending transversely across the dovetail tenon which is aligned with the groove in the end face of the holder and a locking pin extending through said grooves.

* * * * *